US012771561B2

(12) United States Patent
Nelabhotla et al.

(10) Patent No.: US 12,771,561 B2
(45) Date of Patent: Oct. 20, 2026

(54) EFFICIENT MUTUAL AUTHENTICATION OF SERVER AND CLIENT

(71) Applicant: Tata Consultancy Services Limited, Mumbai (IN)

(72) Inventors: Narendra Kumar Venkata Nelabhotla, Hyderabad (IN); Lakshmi Padmaja Maddali, Hyderabad (IN); Harika Narumanchi, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 19/247,981

(22) Filed: Jun. 24, 2025

(65) Prior Publication Data

US 2026/0019285 A1 Jan. 15, 2026

(30) Foreign Application Priority Data

Jul. 9, 2024 (IN) ............................ 202421052518

(51) Int. Cl.
*H04L 9/08* (2006.01)
*H04L 9/32* (2006.01)

(52) U.S. Cl.
CPC .......... *H04L 9/3271* (2013.01); *H04L 9/0825* (2013.01); *H04L 9/085* (2013.01); *H04L 9/0866* (2013.01)

(58) Field of Classification Search
CPC ..... H04L 9/0825; H04L 9/085; H04L 9/0866; H04L 9/3271
USPC .......................................................... 713/168
See application file for complete search history.

(56) References Cited

U.S. PATENT DOCUMENTS

| | | | | |
|---|---|---|---|---|
| 8,230,219 | B2 * | 7/2012 | Ho | H04L 9/3226 713/168 |
| 8,776,176 | B2 | 7/2014 | Stebila et al. | |
| 10,432,400 | B2 * | 10/2019 | Nair | H04L 9/0825 |
| 10,924,289 | B2 * | 2/2021 | Chumbley | H04L 9/0894 |
| 11,171,964 | B1 * | 11/2021 | Huang | G06F 21/33 |
| 11,558,375 | B1 * | 1/2023 | Cao | H04L 9/3226 |
| 2008/0046740 | A1 * | 2/2008 | Narayanan | H04L 63/083 713/176 |

(Continued)

OTHER PUBLICATIONS

Author: Johannes Kunke , Stephan Wiefling, Markus Ullmann, Luigi Lo Iacono Title: Evaluation of Account Recovery Strategies with FIDO2-based Passwordless Authentication Date: 2021 Link: https://arxiv.org/pdf/2105.12477.

*Primary Examiner* — Thanh T Le
(74) *Attorney, Agent, or Firm* — Finnegan, Henderson, Farabow, Garrett & Dunner, LLP

(57) ABSTRACT

Password based authentication is one of the common forms of authentication used in practice. However, when a user/client device enrolls with a server using password information, the authentication process exposes hash of password information to the server which is prone to various types of passwords guessing attacks. Present disclosure provides a system and a method that authenticates a user without revealing his/her password information to a third-party identity provider. This is done by using bilinear parings to authenticate user without sending password information to the server and by way generating client shared secret, server secret, public key, private key and the like. This eliminates the need for storing any keys on multiple devices/third parties or storing password information on the server side.

20 Claims, 9 Drawing Sheets

(56) References Cited

U.S. PATENT DOCUMENTS

| | | | | |
|---|---|---|---|---|
| 2011/0307698 | A1* | 12/2011 | Vanstone | H04L 9/0825 713/171 |
| 2017/0208045 | A1* | 7/2017 | Huh | H04L 9/3247 |
| 2019/0173671 | A1* | 6/2019 | Yang | H04L 9/0841 |
| 2019/0372759 | A1* | 12/2019 | Rix | H04L 9/3263 |
| 2020/0021448 | A1* | 1/2020 | Chumbley | H04L 63/0884 |
| 2021/0067961 | A1* | 3/2021 | Dhammawat | H04W 12/041 |
| 2021/0099292 | A1* | 4/2021 | Gilton | H04L 9/0825 |
| 2024/0080182 | A1* | 3/2024 | Jung | H04L 9/0825 |
| 2024/0273453 | A1* | 8/2024 | Bear | G06Q 10/0832 |
| 2024/0323014 | A1* | 9/2024 | Golic | H04W 12/80 |
| 2025/0192990 | A1* | 6/2025 | Nakagawa | H04L 9/16 |

* cited by examiner

EFFICIENT MUTUAL AUTHENTICATION OF SERVER AND CLIENT

PRIORITY CLAIM

This U.S. patent application claims priority under 35 U.S.C. § 119 to: Indian Patent Application number 202421052518 filed on Jul. 9, 2024. The entire contents of the aforementioned application are incorporated herein by reference.

TECHNICAL FIELD

The disclosure herein generally relates to authentication techniques, and, more particularly, to efficient mutual authentication of server and client.

BACKGROUND

Password based authentication is one of the common forms of authentication used in practice. However, when a user/client device enrolls with a server using password information, the authentication process exposes hash of password information to the server which is prone to various types of passwords guessing attacks such as dictionary attacks, credential stuffing, brute-force attacks, password spraying and so on. Hence, this can lead to unauthorized usage of applications using the stolen password.

SUMMARY

Embodiments of the present disclosure present technological improvements as solutions to one or more of the above-mentioned technical problems recognized by the inventors in conventional systems.

For example, in one aspect, there is provided a processor implemented method for efficient mutual authentication of server and client. The method comprises invoking at a client device, a key-pair technique via one or more hardware processors, for selection of a private key for a user; computing, by using the key-pair technique via one or more hardware processors, a public key based on the selected private key; selecting a username for the user; and obtaining, at the client device, an encrypted shared secret generated by a server based on at least one of the username and the computed public key, wherein the shared secret is unique and specific to the user, wherein the encrypted shared secret is indicative of a successful registration of the user at the server, and wherein the shared secret is computed based on a randomly selected server secret.

In an embodiment, the method further comprises transmitting via the client device an authentication request to the server; obtaining at the client device a challenge from the server; transmitting a response by the client device to the server based on the obtained challenge; and obtaining, from the server, an authentication confirmation of the user based on a comparison of the transmitted response with a reference response generated by the server.

In an embodiment, the server is authenticated by obtaining by the server a challenge and the username unique to the user from the client device; retrieving by the server an associated public key pertaining to the username and generating a response thereof; and authenticating the server based on a reference response generated by the client device based on the associated public key and the generated response.

In an embodiment, the method further comprises in an event that the shared secret is forgotten by the user: transmitting, from the client device, the username specific to the user; obtaining, by the client device, a randomly generated and encrypted challenge from the server, wherein the randomly generated and encrypted challenge is based on the computed public key associated with the user; decrypting, by the client device, the randomly generated and encrypted challenge obtained from the server by using the selected private key associated with the user to obtain a decrypted challenge; computing a response to the decrypted challenge and transmitted to the server thereof; and obtaining the encrypted shared secret from the server based on a comparison of the computed response with a reference result computed by the server.

In an embodiment, the method further comprises in an event that the username is forgotten by the user: transmitting, by the client device, an encrypted set of parameters comprising the shared secret and the computed public key associated with the user to the server; wherein the encrypted set of parameters is based on a computed public key associated with the server; and obtaining the username specific to the user based on a comparison of (i) a tuple comprising the shared secret and the computed public key being decrypted by the server, and (ii) an associated authentication database.

In an embodiment, the method further comprises in an event that the selected private key is forgotten by the user: invoking at the client device, the key-pair technique via one or more processors, for randomly selecting a new private key for the user; computing, by the client device, a new public key for the user based on the new selected private key; transmitting, by the client device, an encrypted set of parameters comprising the username, the shared secret, and the new public key to the server; wherein the encrypted set of parameters is based on a computed public key associated with the server; obtaining, from the server, an acknowledgement along with an encrypted shared secret by the client device, wherein the server (a) performs a comparison of (i) the shared secret being decrypted by the server, and (ii) an associated authentication database, (b) updates the public key with the new public key, and (c) outputs the encrypted shared secret based on uniqueness of a pair comprising the new public key and the shared secret.

In an embodiment, the method further comprises in an event that the private key is to be reset by the user: transmitting, by the client device, a reset request pertaining to the private key to the server; obtaining, by the client device, a randomly generated and encrypted challenge from the server in response to the reset request; decrypting, by the client device, the randomly generated and encrypted challenge by using the selected private key pertaining to the user to obtain a decrypted challenge; generating, at the client device, a response to the decrypted challenge; invoking, the key-pair technique comprised in the client device, for selection of a new private key and computing a new public key based on the new private key, wherein the step of invoking is based on a reference result computed by the server and compared with the generated response; generating, by the client device, a result based on the new private key and the new public key; transmitting, by the client device, the generated result, the username, and the new public key to the server; and obtaining, from the server, an acknowledgement along with an encrypted shared secret by the client device, wherein the server (i) computes a reference result and verifies with the generated result, (ii) updates the public key with the new public key, and (iii) outputs the encrypted shared secret based on uniqueness of a pair comprising the new public key and the shared secret.

In another aspect, there is provided a processor implemented system for efficient mutual authentication of server and client. The system serving as a client device comprises a memory storing instructions; one or more communication interfaces; and one or more hardware processors coupled to the memory via the one or more communication interfaces, wherein the one or more hardware processors are configured by the instructions to: invoke at the client device, a key-pair technique, for selection of a private key for a user; compute, by using the key-pair technique, a public key based on the selected private key; select a username for the user; and obtain an encrypted shared secret generated by a server based on at least one of the username and the computed public key, wherein the shared secret is unique and specific to the user, wherein the encrypted shared secret is indicative of a successful registration of the user at the server, and wherein the shared secret is computed based on a randomly selected server secret.

In an embodiment, the user is authenticated by transmitting via the client device an authentication request to the server; obtaining at the client device a challenge from the server; transmitting a response by the client device to the server based on the obtained challenge; and obtaining, from the server, an authentication confirmation of the user based on a comparison of the transmitted response with a reference response generated by the server.

In an embodiment, the server is authenticated by obtaining by the server a challenge and the username unique to the user from the client device; retrieving by the server an associated public key pertaining to the username and generating a response thereof; authenticating the server based on a reference response generated by the client device based on the associated public key and the generated response.

In an embodiment, in an event that the shared secret is forgotten by the user, the wherein the one or more hardware processors are configured by the instructions to transmit, from the client device, the username specific to the user; obtain a randomly generated and encrypted challenge from the server, wherein the randomly generated and encrypted challenge is based on the computed public key associated with the user; decrypt the randomly generated and encrypted challenge obtained from the server by using the selected private key associated with the user to obtain a decrypted challenge; compute a response to the decrypted challenge and transmitted to the server thereof; and obtain the encrypted shared secret from the server based on a comparison of the computed response with a reference result computed by the server.

In an embodiment, in an event that the username is forgotten by the user, the one or more hardware processors are configured by the instructions to transmit an encrypted set of parameters comprising the shared secret and the computed public key associated with the user to the server; wherein the encrypted set of parameters is based on a computed public key associated with the server; and obtain the username specific to the user based on a comparison of (i) a tuple comprising the shared secret and the computed public key being decrypted by the server, and (ii) an associated authentication database.

In an embodiment, in an event that the selected private key is forgotten by the user, the one or more hardware processors are configured by the instructions to invoke at the client device, the key-pair technique via one or more processors, for randomly selecting a new private key for the user; compute, by the client device, a new public key for the user based on the new selected private key; transmit, by the client device, an encrypted set of parameters comprising the username, the shared secret, and the new public key to the server; wherein the encrypted set of parameters is based on a computed public key associated with the server; obtain, from the server, an acknowledgement along with an encrypted shared secret, wherein the server (a) performs a comparison of (i) the shared secret being decrypted by the server, and (ii) an associated authentication database, (b) updates the public key with the new public key, and (c) outputs the encrypted shared secret based on uniqueness of a pair comprising the new public key and the shared secret.

In an embodiment, in an event that the private key is to be reset by the user, the one or more hardware processors are configured by the instructions to transmit a reset request pertaining to the private key to the server; obtain, by the client device, a randomly generated and encrypted challenge from the server in response to the reset request; decrypt, by the client device, the randomly generated and encrypted challenge by using the selected private key pertaining to the user to obtain a decrypted challenge; generate, at the client device, a response to the decrypted challenge; invoke, the key-pair technique comprised in the client device, for selection of a new private key and computing a new public key based on the new private key, wherein the step of invoking is based on a reference result computed by the server and compared with the generated response; generate, by the client device, a result based on the new private key and the new public key; transmit, by the client device, the generated result, the username, and the new public key to the server; and obtain, from the server, an acknowledgement along with an encrypted shared secret by the client device, wherein the server (i) computes a reference result and verifies with the generated result, (ii) updates the public key with the new public key, and (iii) outputs the encrypted shared secret based on uniqueness of a pair comprising the new public key and the shared secret.

In yet another aspect, there are provided one or more non-transitory machine-readable information storage mediums comprising one or more instructions which when executed by one or more hardware processors cause efficient mutual authentication of server and client by invoking at a client device, a key-pair technique, for selection of a private key for a user; computing, by using the key-pair technique, a public key based on the selected private key; selecting a username for the user; and obtaining, at the client device, an encrypted shared secret generated by a server based on at least one of the username and the computed public key, wherein the shared secret is unique and specific to the user, wherein the encrypted shared secret is indicative of a successful registration of the user at the server, and wherein the shared secret is computed based on a randomly selected server secret.

In an embodiment, the user is authenticated by transmitting via the client device an authentication request to the server; obtaining at the client device a challenge from the server; transmitting a response by the client device to the server based on the obtained challenge; and obtaining, from the server, an authentication confirmation of the user based on a comparison of the transmitted response with a reference response generated by the server.

In an embodiment, the server is authenticated by obtaining by the server a challenge and the username unique to the user from the client device; retrieving by the server an associated public key pertaining to the username and generating a response thereof; authenticating the server based on a reference response generated by the client device based on the associated public key and the generated response.

In an embodiment, in an event that the shared secret is forgotten by the user the one or more instructions which when executed by the one or more hardware processors further cause transmitting, from the client device, the username specific to the user; obtaining, by the client device, a randomly generated and encrypted challenge from the server, wherein the randomly generated and encrypted challenge is based on the computed public key associated with the user; decrypting, by the client device, the randomly generated and encrypted challenge obtained from the server by using the selected private key associated with the user to obtain a decrypted challenge; computing a response to the decrypted challenge and transmitted to the server thereof; and obtaining the encrypted shared secret from the server based on a comparison of the computed response with a reference result computed by the server.

In an embodiment, in an event that the username is forgotten by the user the one or more instructions which when executed by the one or more hardware processors further cause transmitting, by the client device, an encrypted set of parameters comprising the shared secret and the computed public key associated with the user to the server; wherein the encrypted set of parameters is based on a computed public key associated with the server; and obtaining the username specific to the user based on a comparison of (i) a tuple comprising the shared secret and the computed public key being decrypted by the server, and (ii) an associated authentication database.

In an embodiment, in an event that the selected private key is forgotten by the user the one or more instructions which when executed by the one or more hardware processors further cause invoking at the client device, the key-pair technique via one or more processors, for randomly selecting a new private key for the user; computing, by the client device, a new public key for the user based on the new selected private key; transmitting, by the client device, an encrypted set of parameters comprising the username, the shared secret, and the new public key to the server; wherein the encrypted set of parameters is based on a computed public key associated with the server; and obtaining, from the server, an acknowledgement along with an encrypted shared secret by the client device, wherein the server (a) performs a comparison of (i) the shared secret being decrypted by the server, and (ii) an associated authentication database, (b) updates the public key with the new public key, and (c) outputs the encrypted shared secret based on uniqueness of a pair comprising the new public key and the shared secret.

In an embodiment, in an event that the private key is to be reset by the user the one or more instructions which when executed by the one or more hardware processors further cause transmitting, by the client device, a reset request pertaining to the private key to the server; obtaining, by the client device, a randomly generated and encrypted challenge from the server in response to the reset request; decrypting, by the client device, the randomly generated and encrypted challenge by using the selected private key pertaining to the user to obtain a decrypted challenge; generating, at the client device, a response to the decrypted challenge; invoking, the key-pair technique comprised in the client device, for selection of a new private key and computing a new public key based on the new private key, wherein the step of invoking is based on a reference result computed by the server and compared with the generated response; generating, by the client device, a result based on the new private key and the new public key; transmitting, by the client device, the generated result, the username, and the new public key to the server; and obtaining, from the server, an acknowledgement along with an encrypted shared secret by the client device, wherein the server (i) computes a reference result and verifies with the generated result, (ii) updates the public key with the new public key, and (iii) outputs the encrypted shared secret based on uniqueness of a pair comprising the new public key and the shared secret.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
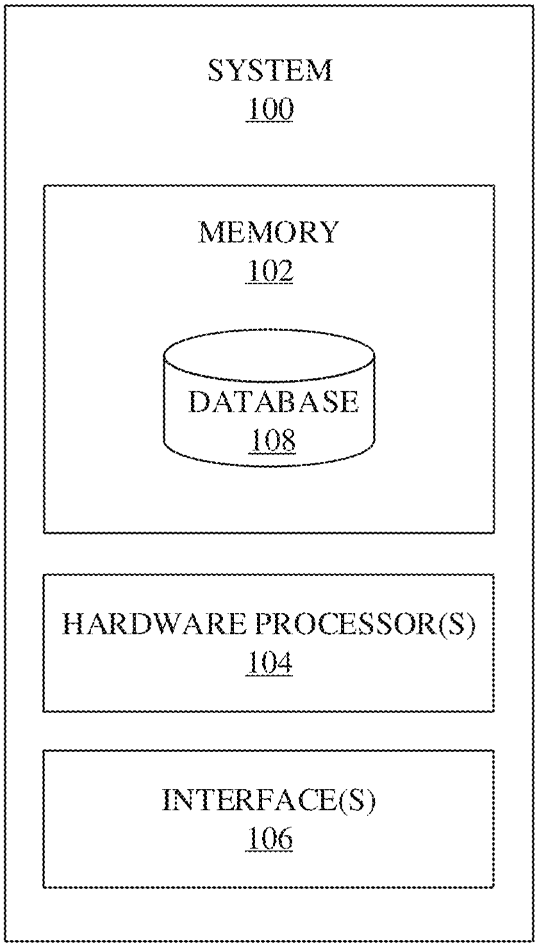
FIG. 1 depicts an exemplary system 100 (e.g., a client device) for efficient mutual authentication of a server and client (e.g., a user), in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Current password-based authentication systems store password hashes on a server for authentication. These password hashes are prone to password guessing attacks such as dictionary attacks, credential stuffing, brute-force attacks and password spraying which can reveal the password to an attacker. This can lead to unauthorized usage of applications using the stolen password. The following are the problems associated with the existing password-based authentication methods:

1. Password Theft: Attacker can capture password while client and server communicate for authentication.
2. Brute force attack: Users often select weak passwords, making them susceptible to guess-work or cracking.
3. Replay Attacks: Capturing password while in transit and retransmit it later.
4. Password Reuse: The practice of reusing passwords across multiple accounts increases the risk of security breaches.
5. Phishing Attacks: Cybercriminals can employ phishing emails or fake websites to trick users into revealing their passwords.

Even in password-less systems, there are challenges such as:

Password-less authentication solutions, such as FIDO (Fast IDentity Online)/WebAuthN, only support some device types or use cases. Even though these (passkeys) mechanisms exist, there is an additional overhead of maintaining multiple copies of master key that is needed for resetting the passkeys. Some solutions are not only inconvenient but also insecure. If the private key is lost, the user would not be able to authenticate himself without resetting password via forgot password workflow. Resetting password is performed using a duplicate copy of his private key. Implementing password-less authentication, especially methods involving hardware tokens, may incur high additional cost.

Moreover, existing systems where authentication is performed without revealing passwords, use zero-knowledge proofs which are computationally expensive. Therefore, there is a need for efficient systems that can authenticate a user without storing password information or any other information from which password can be derived.

Embodiments of the present disclosure provide client and server architecture for authentication of a user without revealing his/her password information to a third-party identity provider. This is done by using bilinear parings to authenticate the user without sending password information to the server. This eliminates the need for storing any keys on multiple devices/third parties or storing password information on server side.

The following are (clear) benefits of the system 100 and the method of the present disclosure in comparison to existing technology:

1. Privacy: User authentication without revealing any password information.
2. Security: Mutual authentication between the client and the server at no additional cost.
3. Usability: Ability to recover user account in case of forgetting any one of the parameters.

Following are the expressions and/or terms used by the system and method of the present disclosure:

1. Server secret: A server secret is a piece of data, generated by and known only to the server.
2. Shared secret: A shared secret is a piece of data, generated using a server secret and known only to the server and the client for which it is generated.
3. Challenge-response authentication: In computer security, challenge-response authentication is a family of protocols in which one party presents a question ("challenge"-usually a random value or a nonce) and another party must provide a valid answer ("response"-computed using challenge and shared secret) to be authenticated.

For the illustration, the system 100 and the method of the present disclosure implemented Bilinear pairings using the library PBC (a standard library from Stanford university). PBC is based on elliptic curves and therefore the elements are represented as coordinates on an elliptic curve, in the form (x,y).

The system and method of the present disclosure leveraged ElGamal encryption scheme for encryption and decryption of messages. In this algorithm, the encryption step generates two ciphertexts c1 and c2. c1 encapsulates the ephemeral key, while c2 conceals the original message. So, encryption of a message m denoted Enc(m) is represented using (c1_m, c2_m).

System Parameters:

```
a.param : type A pairing
q:
878071079966331252243778198475404981580688319941420821 10
2865339926647563088022295707862517942266222142315585876 9
5823174592777133673174813249251299982247 91
h:
1201601226489114607938882136674053420480295440125131182 2
919615131047207289359704531102844802183906537786776
r: 730750818665451621361119245571504901405976559617
exp2: 159
exp1: 107
sign1: 1
sign0: 1
g:
[222651190872251598220437780751889720356990659117359474 57
8817676897250110449078701195247138216585739949905183217 9
5292893945136031511828002084238892978475 26,
1603260695778378380205386533460656970048598919308290049 6
4601361006069983651736455425133121932169727800708994946 2
913815998227298210103705448319630250191568]
```

Referring now to the drawings, and more particularly to FIG. 1 through 9, where similar reference characters denote corresponding features consistently throughout the figures, there are shown preferred embodiments, and these embodiments are described in the context of the following exemplary system and/or method.

FIG. 1 depicts an exemplary system 100 for efficient mutual authentication of server and client (e.g., a user), in accordance with an embodiment of the present disclosure. The system 100 may also be referred to a client device and may be interchangeably used herein. It is to be understood by a person having ordinary skill in the art or person skilled in the art that a server as implemented herein by the present disclosure may have similar components to perform the method described herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), work-stations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information pertaining to client device, user(s) and information transmitted to and received from the server. The database 108 further comprises various techniques such as encryption technique(s), decryption technique(s), bilinear paring techniques to enable the system 100 perform the method described herein, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
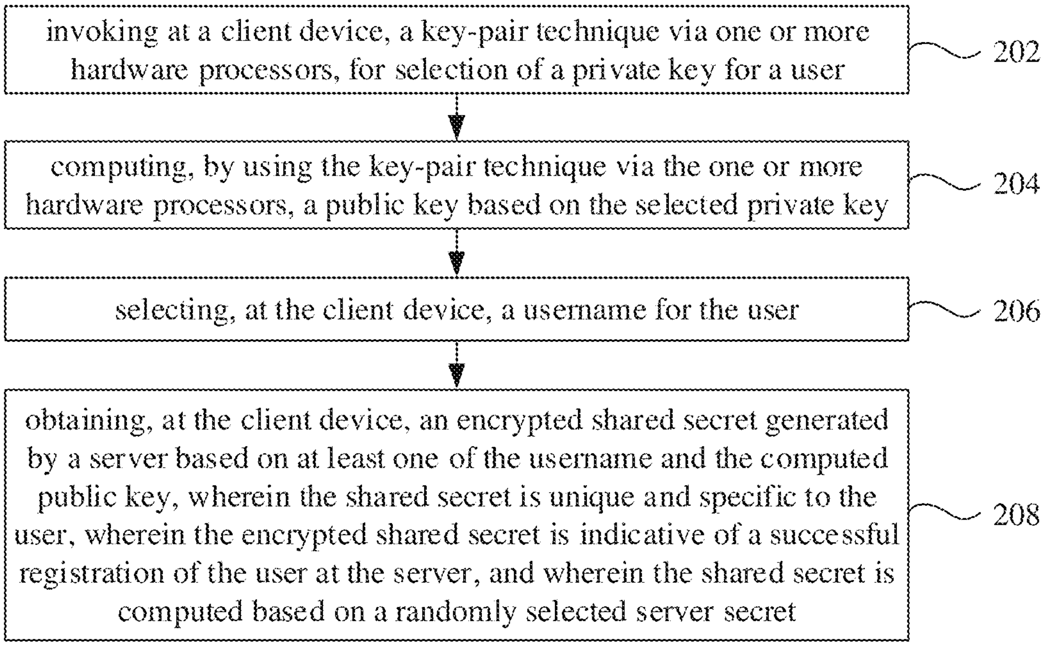
FIG. 2 depicts an exemplary flow chart illustrating a method for efficient mutual authentication of the server and client (e.g., the user), using the system of FIG. 1, in accordance with an embodiment of the present disclosure.

FIG. 2, with reference to FIG. 1, depicts an exemplary flow chart illustrating a method for efficient mutual authentication of the server and client (e.g., the user), using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the sequence diagrams of the system 100 depicted in FIG. 3 through 9, and the flow diagram as depicted in FIG. 2.

Prior to performing steps 202 through 208 by the system 100, there are a few configurations done at the server side. For instance, the server selects one or more groups G, $G_T$ of prime order $r_p$, g as the generator of G and further shares g publicly with all the users/clients which are used by the client in respective client devices/system 100 for various scenarios (e.g., registration, authentication of user and/or server, in the event that user may or may not have forgotten at least one of username, shared secret, private key, to reset shared secret, reset private key, username, and the like, as described herein. At step 202 of the method of the present disclosure, the one or more hardware processors 104 are configured by the instructions to invoke at a client device, a key-pair technique via one or more hardware processors, for selection of a private key for a user. For instance, the key-pair technique is invoked in the client device (e.g., the system 100) for randomly selecting the private key, say $$x \xleftarrow{R} \mathbb{Z}_p \text{ such that } 0 < x < r_p.$$

At step 204 of the method of the present disclosure, the one or more hardware processors 104 are configured by the instructions to compute, by using the key-pair technique, a public key based on the selected private key. For instance, the public key say is computed as $v=g^x$.

At step 206 of the method of the present disclosure, the one or more hardware processors 104 are configured by the instructions to select a username for the user. The username, say 'xyz' is selected accordingly, in one embodiment of the present disclosure. This username is transmitted via the client device (by the user) to a server. It is to be understood by a person having ordinary skill in the art or person skilled in the art that if the username already exists in a username database associated with the server, the server prompts the client device to identify a different username for the user.

At step 208 of the method of the present disclosure, the one or more hardware processors 104 are configured by the instructions to obtain, at the client device, an encrypted shared secret generated by a server based on at least one of the username u, and the computed public key v. The shared secret is unique and specific to the user. The encrypted shared secret is indicative of a successful registration of the user at the server. The shared secret is computed based on a randomly selected server secret. The above step 208 is better understood by way of following description:

The server selects the server secret say $$y \xleftarrow{R} \mathbb{Z}_p$$

such that $0<y<r_p$ and computes a shared secret $u=g^y$ and checks if (u, v) is unique. Once the shared secret $u=g^y$ is computed/generated, it is then encrypted by the server based on the computed public key. The encrypted shared secret is denoted by $Enc_v(u)$ and further transmitted to the client device/user along with an acknowledgement indicating a successful registration of the user. The above steps 202 through 208 are depicted in sequence diagram illustrated in FIG. 3. More specifically, FIG. 3, with reference to FIGS. 1 through 2, depicts a sequence diagram illustrating a user registration to the server via the client device, in accordance with an embodiment of the present disclosure.

The above steps 202 through 208 may be further better understood by way of following exemplary description:

1. x: 502022332400884281354750512950405119474169574486
2. $v = g^x$
[92787932017868512253416082950300069684132492908514816530
40444180786359974237601551517406785197503717125618046564
04559846579848078705889121270413927348865,
21342148119576626843521930255208905153245844903922802942
08349483864272286023434429904444625496761082234564347707
468132699384954970802087561291249158600629]
3. Generate Username, say "Alice"
4. Send Username, Public key to server
    a. Username = "Alice "
    b. v:
    [92787932017868512253416082950300069684132492908514
    816530404441807863599742376015515174067851975037171
    256180465640455984657984807870588912127041392734886
    5,
    213421481195766268435219302552089051532458449039228
    029420834948386427228602343442990444462549676108223
    456434770746813269938495497080208756129124915860062
    9]
5. Generate Shared Secret (u)
    a. y: 432289000753952188432565015904310043117153551362
    b. $u = g^y$
    [84807809021842726409792441465647574859452808608355
    081851373983919651779829007109021825977214071542955
    143473536535785231246640025117336357970059279753245
    19,
    109402917464917024423469279254021440916377174377957
    427079687020296861366539046977461311691694978590819
    728779885108288109049523405322468035692571719884681
    2]
6. Send ACK, $Enc_v(u)$
$Enc_v(u)$: (c1__u, c2__u)
c1__u =
[46018221467678611289358795715697486896116589366957739870
72645000356288342029452274670596180774875206023670659384
753942854163596156984701891430344423591530,
80067616988367350766561733897512275548437120790513858953
42045560382400448510851695896351496911860177034537577965
455702119440452158986647253548211643055020]
c2__u =
[69344601384863982343157690240415420171863130472858360954
44333870870304346543066918835809390907732868539888021795
546199458746385130239427868845705887581614,
37050048308607916667407461368224081571630817614448372938
71355118634293950654089870244982216092187435389413046202
829301743264371547306903161277048975581859]

Upon successful registration, the following information is stored at the client device: g, x, username, v, u and the server stores the following information g, y, username, v, u. It is to be noted that $u^x = v^y = g^{xy}$.

Once the registration is completed, the next time the user logins in with the associated credentials, he/she is required to be authenticated. For authenticating the user, at first the client device transmits an authentication request to the server. This authentication request is accompanied by transmitting the username of the user to the server. In response to the authentication request, the server transmits a challenge to the client device/user. For instance, the server sends a fresh challenge z say $$z \overset{R}{\leftarrow} \mathbb{Z}_p$$

such that $0<z<r_p$.

At the client device, a response by the client device is computed and shared with the server based on the obtained challenge. For instance, the user through the client device computes the response say $resp=e(g^z, u^x)$.

The server obtains the above computed response from the client device and computes a reference response (or a reference result). For instance, the reference response is denoted as reference $resp=e(g^z, v^y)$, and verifies whether the reference response and the computed response (transmitted response) obtained from the client device match. The comparison is denoted by the following expression:

$$e(g^z, u^x) \stackrel{?}{=} e(g^z, v^y)$$

Based on the comparison of the user is authenticated and then the server transmits an authentication confirmation. In other words, the client device obtains the authentication confirmation of the user from the server based on the comparison of the transmitted response with the reference response generated by the server.

Figure 3:
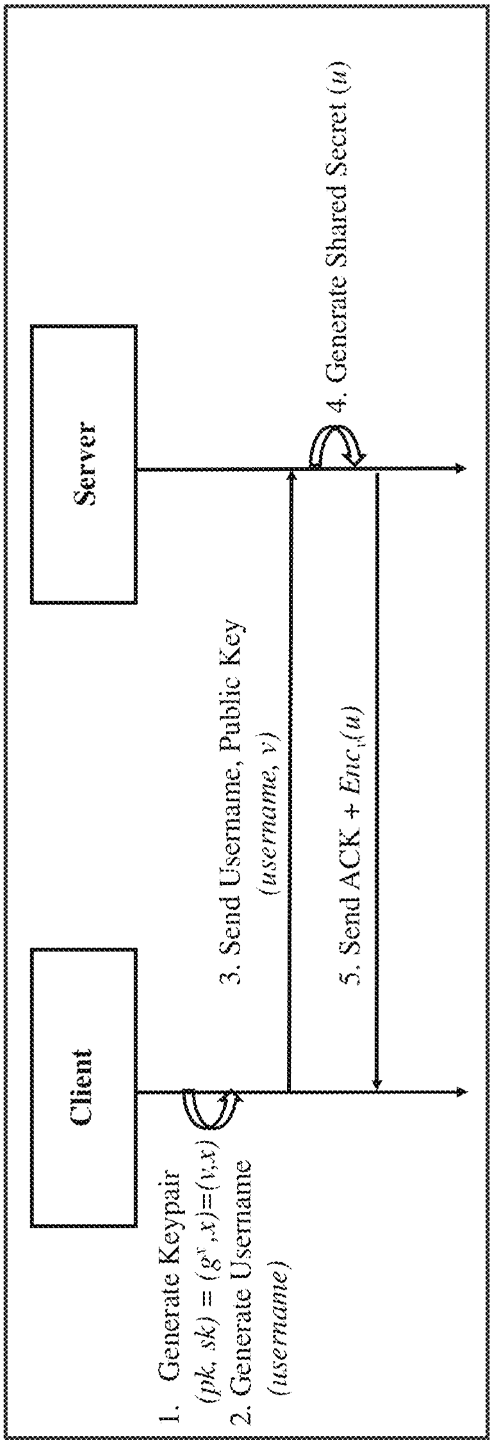
FIG. 3 depicts a sequence diagram illustrating a user registration to the server via the client device, in accordance with an embodiment of the present disclosure.
Figure 4:
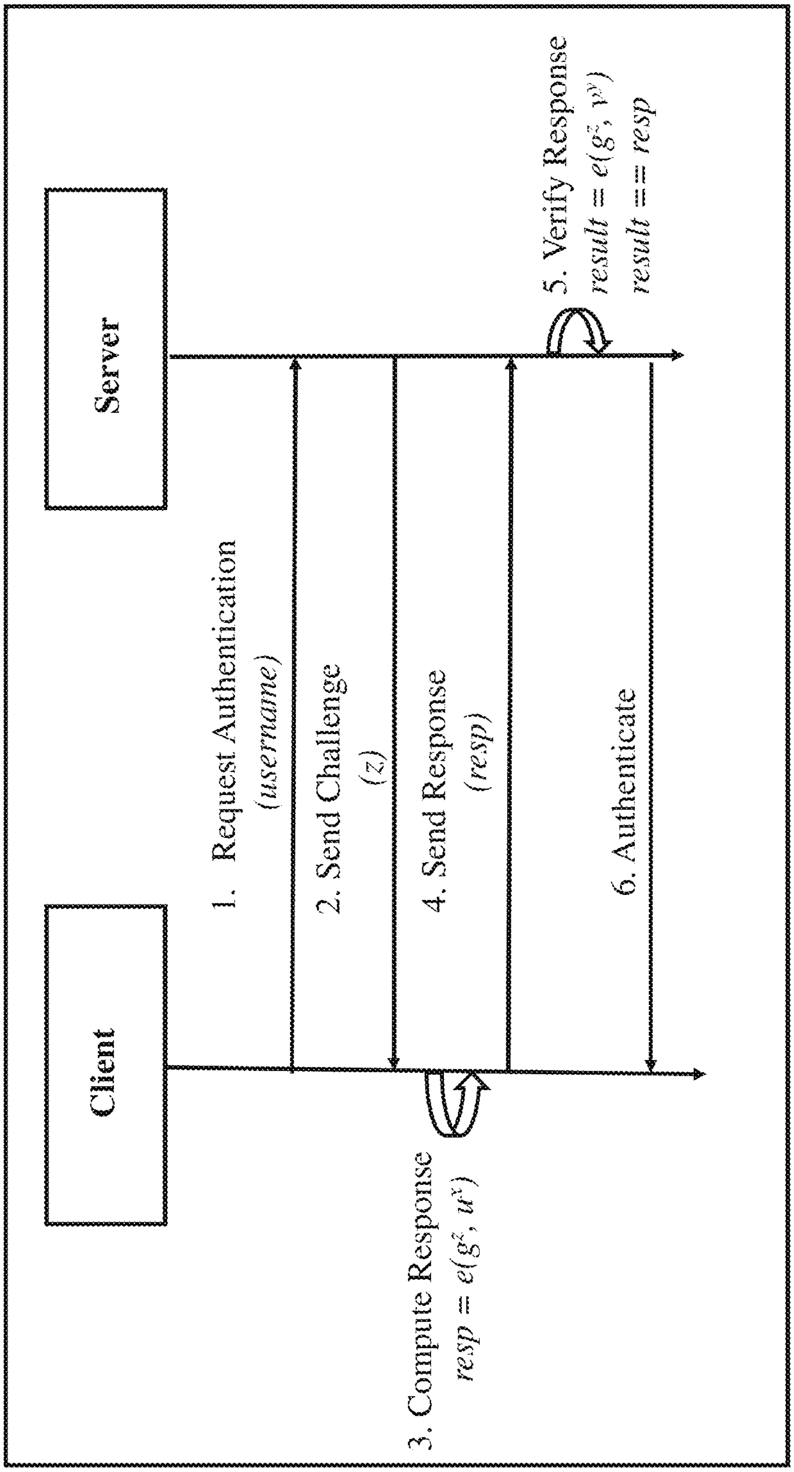
FIG. 4 depicts a sequence diagram illustrating a method of authenticating the user by the server, in accordance with an embodiment of the present disclosure.

FIG. 4, with reference to FIGS. 1 through 3, depicts a sequence diagram illustrating a method of authenticating the user by the server, in accordance with an embodiment of the present disclosure. The above steps of user authentication and the sequence diagram of FIG. 4 may be further better understood by way of following exemplary description:

```
1.  Request Authentication: username= "Alice"
2.  Send Challenge:
    z: 4625169984241933229311842118089055156890900275 61
3.  Compute Response:
        a.  g:
            [22265119087225159822043778075188972035699065911735
            94745788176768972501104490787011952471382165857399 4
            99051832179529289394513603151182800208423889297847 5
            26,
            16032606957783783802053865334606569700485989193082 9
            00496460136100606998365173645542513312193216972780 0
            70899494629138159982272982101037054483196302501915 6
            8]
        b.  u:
            [84807809021842726409792441465647574859452808608355
            08185137398391965177982900710902182597721407154295 5
            14347353653578523124664002511733635797005927975324 5
            19,
            10940291746491702442346927925402144091637717437795 7
            42707968702029686136653904697746131169169497859081 9
            72877988510828810904952340532246803569257171988468 1
            2]
        c.  x: 502022332400884281354750512950405119474169574486
    resp:
    [7751445396845042772214292176757315943659306683267861563 4
    4378085356963078258122174377085631409600506393373963835 4
    1485376226863856611324855802420824950422 24,
    4667096999360173821589592041020403474659100191242558706 9
    5501179863751469239991930285588520774697529512029463866 0
    1137922780270862136813099854669357005410 99]
4.  Send Response (resp)
5.  Verify Response
        a.  v:
            [92787932017868512253416082950300069684132492908514
            81653040444180786359974237601551517406785197503717 1
            25618046564045598465798480787058891212704139273488 6
            5,
            21342148119576626843521930255208905153245844903922 8
            02942083494838642722860234344299044446254967610822 3
            45643477074681326993849549708020875612912491586006 2
            9]
        b.  y: 432289000753952188432565015904310043117153551362
    result:
    [7751445396845042772214292176757315943659306683267861563 4
    4378085356963078258122174377085631409600506393373963835 4
    1485376226863856611324855802420824950422 24,
    4667096999360173821589592041020403474659100191242558706 9
    5501179863751469239991930285588520774697529512029463866 0
    1137922780270862136813099854669357005410 99]
6.  Authenticate:
    resp == result. Therefore, Authenticate Client/user = 1
```

The method of the present disclosure also includes authentication of the server. For authenticating the server, at first the user/client device transmits a challenge and the username unique to the user to the server. For instance, this may be similarly performed as described above where server sent the challenge to the client device/user. For the sake of brevity, say the client device/user generates and sends a fresh challenge z say $$z \overset{R}{\leftarrow} \mathbb{Z}_p$$

such that $0<z<r_p$. In other words, the client device/user challenges the server to authenticate itself by sending username and the challenge z. The server retrieves an associated public key pertaining to the username and generates a response. For instance, the server generated response could be same as described above as reference resp=e($g^z$, $v^y$), which is then transmitted to the client device/user.

The server reference response is denoted as reference resp=e($g^z$, $v^y$), which is verified by the client device computed response for a match. The comparison is denoted by the following expression:

$$e(g^z, v^y) \overset{?}{=} e(g^z, u^x)$$

Based on the comparison the server is authenticated and then the user/client device transmits an authentication confirmation. In other words, the server is authenticated using the reference response generated by the client device based on the associated public key and the generated response.

Figure 5:
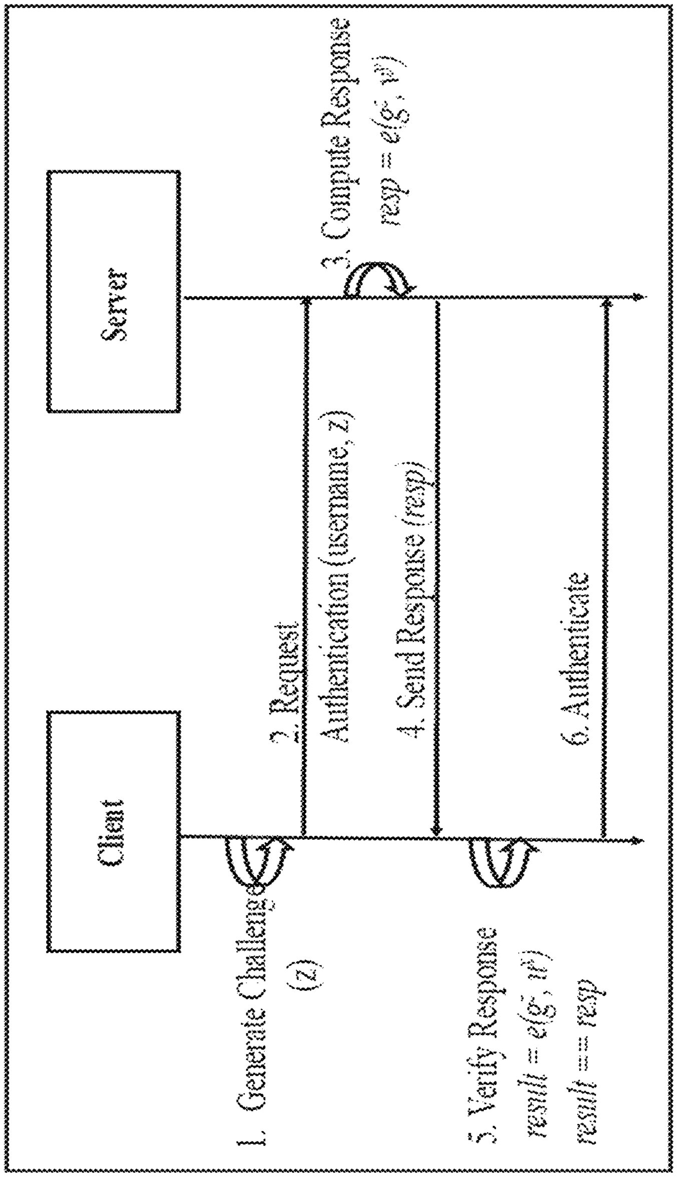
FIG. 5 depicts a sequence diagram illustrating a method of authenticating the server by the user/client device, in accordance with an embodiment of the present disclosure.

FIG. 5, with reference to FIGS. 1 through 4, depicts a sequence diagram illustrating a method of authenticating the server by the user/client device, in accordance with an embodiment of the present disclosure. The above steps of server authentication and the sequence diagram of FIG. 5 may be further better understood by way of following exemplary description:

1. Generate challenge:
   z: 447783542771911324879574978507723632764918563712
2. Request Authentication
   Sends "Alice", z
3. Compute Response
   a. g:
      [22265119087225159822043778075188972035699065911735
      947457881767689725011044907870119524713821658573994
      990518321795292893945136031511828002084238892978475
      26,
      160326069577837838020538653346065697004859891930829
      004964601361006069983651736455425133121932169727800
      708994946291381599822729821010370544831963025019156
      8]
   b. v:
      [92787932017868512253416082950300069684132492908514
      816530404441807863599742376015515174067851975037171
      256180465640455984657984807870588912127041392734886
      5,
      213421481195766268435219302552089051532458449039228
      029420834948386427228602343442990444462549676108223
      456434770746813269938495497080208756129124915860062
      9]
   c. y: 432289000753952188432565015904310043117153551362 resp:
   [61762648148964303342332172008919769000488302592082258660
   23779957835813062014517637804996289845059099203235832624
   404314211164615608723726338431808438507024,
   39903624664046823078572200965795288076548247133039681059
   38840754353615360980531040082383074745038152256071749341
   483314298651697259241732660300437796163389]
4. Send Response (resp)
5. Verify Response
   a. g:
      [22265119087225159822043778075188972035699065911735
      947457881767689725011044907870119524713821658573994
      990518321795292893945136031511828002084238892978475
      26,
      160326069577837838020538653346065697004859891930829
      004964601361006069983651736455425133121932169727800
      708994946291381599822729821010370544831963025019156
      8]
   b. u:
      [84807809021842726409792441465647574859452808608355
      081851373983919651779829007109021825977214071542955
      143473536535785231246640025117336357970059279753245
      19,
      109402917464917024423469279254021440916377174377957
      427079687020296861366539046977461311691694978590819
      728779885108288109049523405322468035692571719884681
      2]
   c. x: 502022332400884281354750512950405119474169574486 result:
   [61762648148964303342332172008919769000488302592082258660
   23779957835813062014517637804996289845059099203235832624
   404314211164615608723726338431808438507024,
   39903624664046823078572200965795288076548247133039681059
   38840754353615360980531040082383074745038152256071749341
   483314298651697259241732660300437796163389]
6. Authenticate:
   resp == result. Therefore, Authenticate Server = 1

The method and the system 100 of the present disclosure also implements a scenario where the shared secret is forgotten by the user. For instance, in an event that the shared secret is forgotten by the user, the client device transmits the username specific to the user. In other words, the client/user sends username to the server with a request to retrieve shared secret. In response to the request to retrieve shared secret the server randomly generates a challenge and encrypts it. This randomly generated challenge is encrypted by using the computed public key associated with the user. For sake of brevity, the method considered the same random challenge z. Hence, the server generates say the challenge z say $$z \overset{R}{\leftarrow} \mathbb{Z}_p$$

such that $0<z<r_p$, and encrypts it using the client's/user's computed public key to get $Enc_v(z)$ which is transmitted to the client device.

At the client device, this randomly generated and encrypted challenge $Enc_v(z)$ is decrypted by using the selected private key associated with the user to obtain a decrypted challenge. In other words, the randomly generated and encrypted challenge $Enc_v(z)$ is decrypted by using the selected private key x to obtain z. Then a client response is computed to the decrypted challenge and transmitted to the server. In other words, response resp=$e(g^z, v)$ is the response computed at the client device which is transmitted to the server. The server then performs a comparison of the computed response with a reference result computed by the server. For instance, the server computes the reference results response resp=e($g^z$, v) and verifies with the computed response as resp==result, wherein the comparison is depicted below by way of expression as:

$$e(g^z, v) \stackrel{?}{=} e(g^z, v)$$

If there is a match, then the server sends the shared secret in an encrypted form to the client device.

Figure 6:
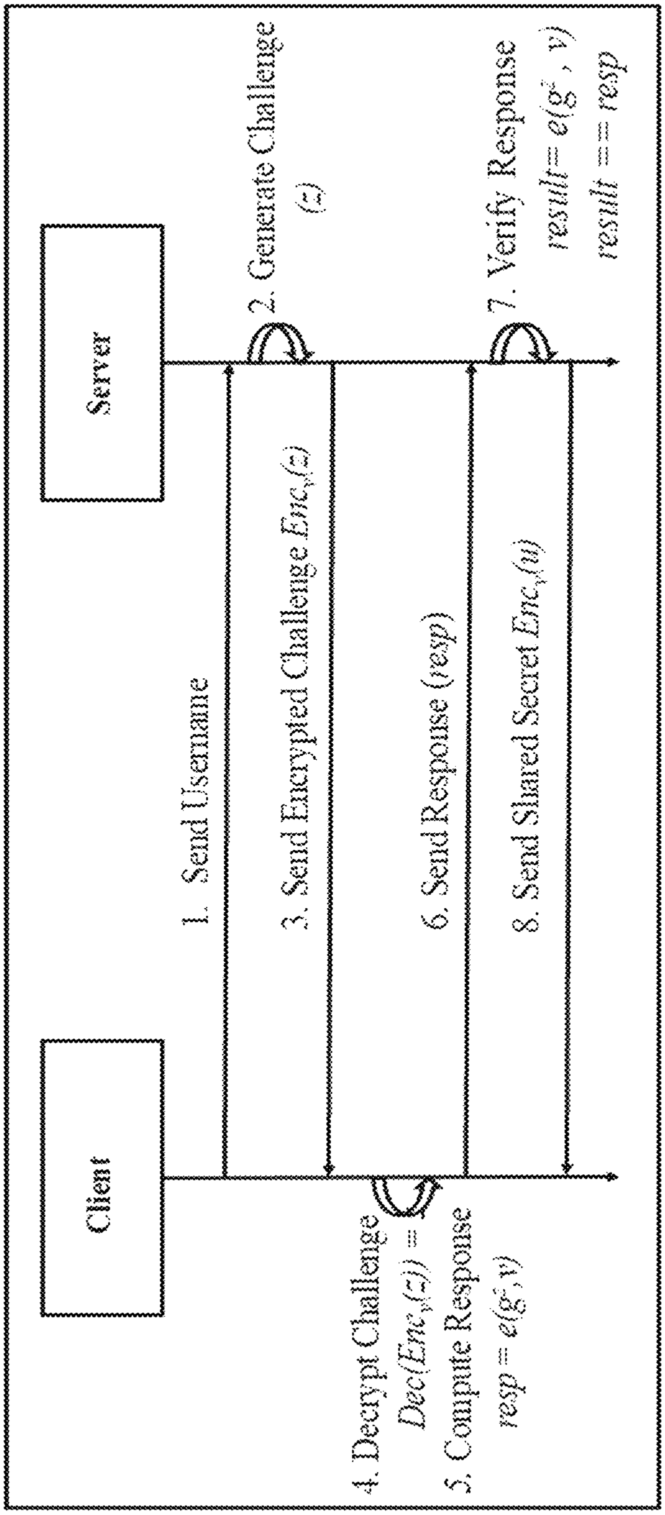
FIG. 6 depicts a sequence diagram illustrating a method for transmitting a shared secret by the server to the client device, in the event that the shared secret is forgotten by the user, in accordance with an embodiment of the present disclosure.

FIG. 6, with reference to FIGS. 1 through 5, depicts a sequence diagram illustrating a method for transmitting an encrypted shared secret by the server to the client device, in the event that the shared secret is forgotten by the user, in accordance with an embodiment of the present disclosure. The above steps of transmitting the encrypted shared secret by the server to the client device and the sequence diagram of FIG. 6 may be further better understood by way of following exemplary description:

---

1. Send Username "Alice"
2. Generate challenge
   z: 462516998424193322931184211808905515689090027561
3. Send Encrypted Challenge
   Enc(z): (c1_z, c2_z)
   c1_z=
   [4601822146767861128935879571569748689611658936695773987072645000356288342029452274670596180774875206023670659384753942854163596156984701891430344423591530,
   8006761698836735076656173389751227554843712079051385895342045560382400448510851695896351496911860177034537577965455702119440452158986647253548211643055020]
   c2_z=
   [6810953549987737896431947587529244414508020017907200076195632171563229414718082224425622130672497106207142083449357942161906813616348123684399083937844202,
   7889690332107956203437769512387456580209681943078766799663523215470424863878560184329234346899940755355615735211642339971548091495578448151822670111932123]
4. Decrypt challenge:
   z=462516998424193322931184211808905515689090027561
5. Compute Response:
   a. g:
   [2226511908722515982204377807518897203569906591173594745788176768972501104490787011952471382165857399499051832179529289394513603151182800208423889297847526,
   1603260695778378380205386533460656970048598919308290049646013610060699836517364554251331219321697278007089949462913815998227298210103705448319630250191568]
   b. v:
   [927879320178685122534160829503000696841324929085148165304044418078635997423760155151740678519750371712561804656404559846579848078705889121270413927348865,
   2134214811957662684352193025520890515324584490392280294208349483864272286023434429904444625496761082234564347707468132699384954970802087561291249158600629]
   resp:
   [5810506291557140819837995750193299398089600193821660845596340015152244549747295219715578801143392802143455964766294236878075450801767446035262880964594651,
   580701883666982348377558198433925478194458247497463483717683400815285077075365261014748399457212918311012758542820375032859423980880216362483386412203206]
6. Send Response: (resp)
7. Verify Response:
   result:
   [5810506291557140819837995750193299398089600193821660845596340015152244549747295219715578801143392802143455964766294236878075450801767446035262880964594651,
   580701883666982348377558198433925478194458247497463483717683400815285077075365261014748399457212918311012758542820375032859423980880216362483386412203206]
   resp == result. Therefore, verification is successful.
8. Send Shared Secret:
   Enc(u): (c1_u, c2_u)
   c1_u =
   [4601822146767861128935879571569748689611658936695773987072645000356288342029452274670596180774875206023670659384753942854163596156984701891430344423591530,
   8006761698836735076656173389751227554843712079051385895342045560382400448510851695896351496911860177034537577965

-continued 4557021194404521589866472535482116430550 20]
c2__u =
[69344601384863982343157690240415420171863130472858360954
44333870870304346543066918835809390907732868539888021795
5461994587463851302394278688457058875816 14,
37050048308607916667407461368224081571630817614448372938
71355118634293950654089870244982216092187435389413046202
829301743264371547306903161277048975581859]

The method and the system 100 of the present disclosure also implements a scenario where in an event that the username is forgotten by the user. For instance, in the event that the username is forgotten by the user, the client device/user transmits an encrypted set of parameters comprising the shared secret and the computed public key associated with the user to the server. The encrypted set of parameters is based on a computed public key associated with the server, in one embodiment of the present disclosure. In other words, the user transmits via the client device, the shared secret u and the associated public key v in an encrypted form denoted as $Enc_{pk_s}(u, v)$ to the server to retrieve the username. The server then decrypts the $Enc_{pk_s}(u, v)$ to obtain (u, v). The user authenticity is then verified by the server by querying the tuple (u, v) in an authentication database comprised in the server to retrieve the corresponding username, if any. On successful verification, the server transmits the username to the client device. In other words, the client device obtains the username specific to the user based on a comparison of (i) a tuple comprising the shared secret and the computed public key being decrypted by the server, and (ii) an associated authentication database.

Figure 7:
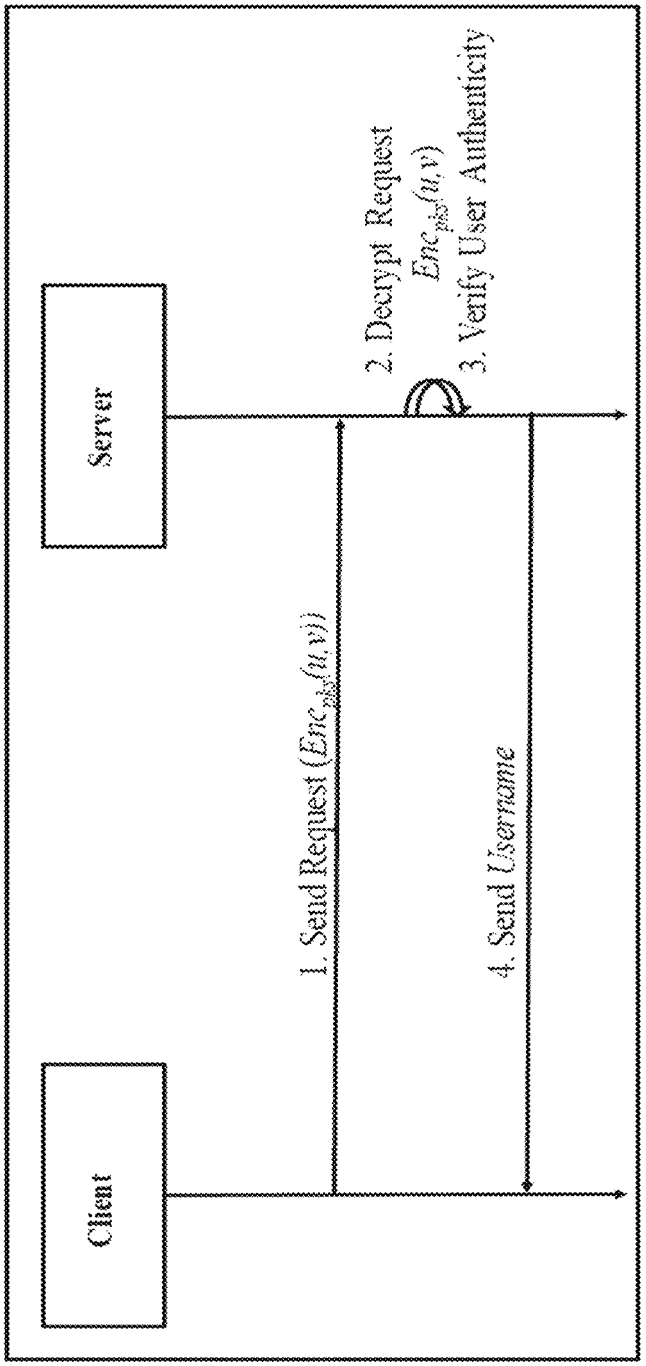
FIG. 7 depicts a sequence diagram illustrating a method of transmitting the username associated with the user by the server to the client device, in the event that the username is forgotten by the user, in accordance with an embodiment of the present disclosure.

FIG. 7, with reference to FIGS. 1 through 6, depicts a sequence diagram illustrating a method of transmitting the username associated with the user by the server to the client device, in the event that the username is forgotten by the user, in accordance with an embodiment of the present disclosure. The above steps of transmitting the username associated with the user by the server to the client device and the sequence diagram of FIG. 7 may be further better understood by way of following exemplary description:

1. Send request $Enc_{pk_s}(u, v)$:
u:
[84807809021842726409792441465647574859452808608355081851
37398391965177982900710902182597721407154295514347353653
5785231246640025117336357970059279753245 19,
10940291746491702442346927925402144091637717437795742707
96870202968613665390469774613116916949785908197287798851
082881090495234053224680356925717198846812]
v:
[92787932017868512253416082950300069684132492908514816530
40444180786359974237601551517406785197503717125618046564
0455984657984807870588912127041392734886 5,
21342148119576626843521930255208905153245844903922802942
08349483864272286023434429904444625496761082234564347707
468132699384954970802087561291249158600629]
a. Enc(u) = (c1__u, c2__u)
c1__u =
[46018221467678611289358795715697486896116589366957
73987072645000356288342029452274670596180774875206 0
23670659384753942854163596156984701891430344423591 5
30,
80067616988367350766561733897512275548437120790513 8
58953420455603824004485108516958963514969118601770 3
45375779654557021194404521589866472535482116430550 2
0]
c2__u=
[69344601384863982343157690240415420171863130472858
36095444333870870304346543066918835809390907732868 5
39888021795546199458746385130239427868845705887581 6
14,
37050048308607916667407461368224081571630817614448 3
72938713551186342939506540898702449822160921874353 8
94130462028293017432643715473069031612770489755818 5
9]
b. Enc(v) = (c1__v, c2__v)
c1__v =
[46018221467678611289358795715697486896116589366957
73987072645000356288342029452274670596180774875206 0
23670659384753942854163596156984701891430344423591 5
30,
80067616988367350766561733897512275548437120790513 8
58953420455603824004485108516958963514969118601770 3
45375779654557021194404521589866472535482116430550 2
0]
c2__v =
[51600830604136887877265835301964903866320106290672
79387954696660326530988122749935505639474855980672 8

-continued 58474326629421925222236732872647458723484830797949910,
488966859019134919614913568442404415776720972958768
345448220814416387811090721038174308287419520435635
509328002271748727950122686625922680218751560965839
2]

c. Send Enc(u) and Enc(v) to server

2. Decrypt Request:
   a. Decrypt Enc(u) and Enc(v) to get:
      i. u:
      [848078090218427264097924414656475748594528086
      083550818513739839196517798290071090218259772
      140715429551434735365357852312466400251173363
      5797005927975324519,
      109402917464917024423469279254021440916377174
      377957427079687020296861366539046977461311691
      694978590819728779885108288109049523405322468
      0356925717198846812]
      ii. v:
      [927879320178685122534160829503000696841324929
      085148165304044418078635997423760155151740678
      519750371712561804656404559846579848078705889
      121270413927348865,
      213421481195766268435219302552089051532458449
      039228029420834948386427228602343442990444462
      549676108223456434770746813269938495497080208
      756129124915860 0629]

3. Verify User Authenticity:
   a. Server looks for the tuple (u, v) in the authentication database to retrieve the corresponding username, if any. For example, say (u,v) is mapped to username "Alice" in authentication database.

4. Send Username "Alice".

The method and the system 100 of the present disclosure also implements yet another scenario where in an event that the selected private key is forgotten by the user. For instance, in the event that the selected private key is forgotten by the user, the client device/user invokes the key-pair technique, for randomly selecting a new private key for the user. A new public key is then computed for the user based on the new selected private key. The selected private key is say denoted by $$x' \overset{R}{\leftarrow} \mathbb{Z}_p$$

such that $0<x'<r_p$. The client device/user computes the new public key which is denoted as $v'=g^{x'}$. The client device then transmits the encrypted set of parameters comprising the username, the shared secret, and the new public key to the server. In other words, the client device/user transmits $Enc_{pk_s}$(username, u, v') to the server. The encrypted set of parameters is based on a computed public key associated with the server. The $Enc_{pk_s}$(username, u, v') is transmitted to the server to modify the private key. The server decrypts $Enc_{pk_s}$(username, u, v') using the server's private key to get the username, u, and v'. The server queries the authentication database for presence of the tuple (username, u) to verify the authenticity. Upon successful verification, the server updates the old public key v with new public key v' and checks the uniqueness of (u, v'). If (u, v') pair already exists, the server generates new random shared secret u' and updates u to u' in server's database only if (u', v') is unique. Upon successful updation of the new keypair, the server sends ACK to client device/user. In case u is updated to u', the server also sends $Enc_v$(u') to the client device/user.

In other words, the client device obtains an acknowledgement along with an encrypted shared secret from the server wherein this acknowledgement is obtain after the server (a) performs a comparison of (i) the shared secret being decrypted by the server, and (ii) an associated authentication database, (b) updates the public key with the new public key, and (c) outputs the encrypted shared secret based on uniqueness of a pair comprising the new public key and the shared secret.

Figure 8:
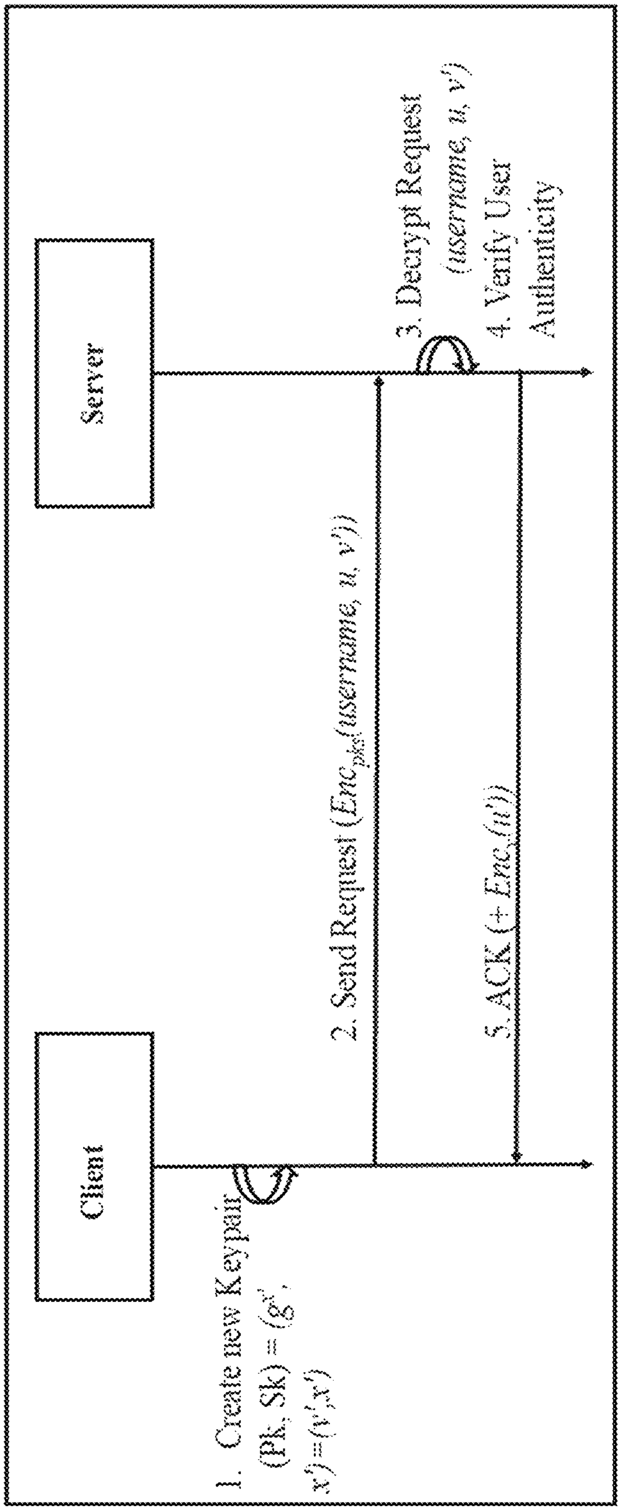
FIG. 8 depicts a sequence diagram illustrating a method of transmitting the encrypted shared secret associated with the user by the server to the client device, in the event that the private key is forgotten by the user, in accordance with an embodiment of the present disclosure.

FIG. 8, with reference to FIGS. 1 through 7, depicts a sequence diagram illustrating a method of transmitting the encrypted shared secret associated with the user by the server to the client device, in the event that the private key is forgotten by the user, in accordance with an embodiment of the present disclosure. The above steps of transmitting the encrypted shared secret associated with the user by the server to the client device and the sequence diagram of FIG. 8 may be further better understood by way of following exemplary description:

1. Create new keypair:
   a. x': 67781265402473407434679433617898535616962058157 5
   b. $v' = g^{x'}$
   [257621642049576027736373708073424118527854217983 87
   181834975609105785216701108640937469429035079330003
   729599139462150937052881142822831923447485079803497
   68, -continued 151259023655223038954950755120275612420664550657053
516598004604846012580133524416679422587256872470491
514322285823906719875380745559574884102536490229718
1]

2. Send Request: Enc(username), Enc(u), Enc(v')

a. Enc(username): Enc(Alice)
Username
[569615292625274341774081307140655040809908942410615
884768525516557608471677314421964670848032633387012
178458499945757185845939488275876880187548285989336
5,
216860029214090806138402318363591048850556243776386
037287523047470758546551367993304455367922366260190
675387169556468732491101603286756354292469395919980
5]
Enc(username) = (c1__username, c2__username)
c1__username =
[460182214676786112893587957156974868961165893669577
398707264500035628834202945227467059618077487520602
367065938475394285416359615698470189143034442359153
0,
800676169883673507665617338975122755484371207905138
589534204556038240044851085169589635149691186017703
453757796545570211944045215898664725354821164305502
0]
c2__username =
[564818996030162756312557214350592055748729037162720
824332675485881227061837835243483674935936848682403
892015278815326933628173647599215444914795042889617
8,
800861090734699970098828892844650723671046817815608
154883594307356455087875013195793644314237546569293
179675658533573298230188589286315869132004057827024
1]

b. Enc(u) = (c1__u, c2__u)
u:
[848078090218427264097924414656475748594528086083550
818513739839196517798290071090218259772140715429551
434735365357852312466400251173363579700592797532451
9,
109402917464917024423469279254021440916377174377957
427079687020296861366539046977461311691694978590819
728779885108288109049523405322468035692571719884681
2]
c1__u =
[460182214676786112893587957156974868961165893669577
398707264500035628834202945227467059618077487520602
367065938475394285416359615698470189143034442359153
0,
800676169883673507665617338975122755484371207905138
589534204556038240044851085169589635149691186017703
453757796545570211944045215898664725354821164305502
0]
c2__u=
[693446013848639823431576902404154201718631304728583
609544433387087030434654306691883580939090773286853
988802179554619945874638513023942786884570588758161
4,
370500483086079166674074613682240815716308176144483
729387135511863429395065408987024498221609218743538
941304620282930174326437154730690316127704897558185
9]
Enc(v') = (c1__v', c2__v')
v'=
[257621642049576027736373708073424118527854217983871
818349756091057852167011086409374694290350793300037
295991394621509370528811428228319234474850798034976
8,
151259023655223038954950755120275612420664550657053
516598004604846012580133524416679422587256872470491
514322285823906719875380745559574884102536490229718
1]
c1__v' =
[460182214676786112893587957156974868961165893669577
398707264500035628834202945227467059618077487520602
367065938475394285416359615698470189143034442359153
0,
800676169883673507665617338975122755484371207905138
589534204556038240044851085169589635149691186017703

-continued

---

4537577965455702119440452158986647253548211643055020]
c2_v' =
[3703537590676006626660324995748133285409485795529847352782335381305714643067142808997199533039833130269690068621380607738653324049955838480442705995568636,
3833600985437270834889741101302407575781352086619834501616827561362527759764399813533965748001413147978737406018292489641643413469307833302873092461582089]

3. Decrypt request:
   a. Username: "Alice"
   b. u:
   [8480780902184272640979244146564757485945280860835508185137398391965177982900710902182597721407154295514347353653578523124664002511733635797005927975324519,
   1094029174649170244234692792540214409163771743779574270796870202968613665390469774613116916949785908197287798851082881090495234053224680356925717198846812]
   c. v':
   [2576216420495760277363737080734241185278542179838718183497560910578521670110864093746942903507933000372959913946215093705288114282283192344748507980349768,
   1512590236552230389549507551202756124206645506570535165980046048460125801335244166794225872568724704915143222858239067198753807455595748841025364902297181]

4. Verify User Authenticity:
Server looks for the tuple (username, u) in the authentication database to verify authenticity of the client. Upon successful verification, the server updates the old public key v with the new public key v' and checks the uniqueness of (u, v'). If (u, v') pair already exists, server generates new random shared secret u' and updates u to u' in server's database only if (u', v') is unique.
u' =
[3214496383194451750046071982978249601757933296242889210917470938043803127339935881931126750806710796475746320906077227772122044044929140088193001527158535,
7537522376228638368155239723382379153883242346958836436401454232495872636578758042616731126213151634656093716047429726981589930052932913015552147393739450]
Enc(u') = (c1_u', c2_u')
c1_u' =
[4601822146767861128935879571569748689611658936695773987072645000356288342029452274670596180774875206023670659384753942854163596156984701891430344423591530,
8006761698836735076656173389751227554843712079051385895342045560382400448510851695896351496911860177034537577965455702119440452158986647253548211643055020]
c2_u'=
[1923752539925922807255508180654141945018543165059248529803847494319499008379364008610938399580410347623439864415098840283232699495447834644965047406668940,
5453783632551422347400044020146125210645675770293872266046797818044863362746117272573218365134891654262274508910207785925806014051730119766835760030841806]
ACK + Enc(u')

---

The method and the system 100 of the present disclosure also implements a further scenario where in an event that the private key is to be reset by the user. For instance, in the event that the private key is to be reset by the user, the client device transmits a reset request pertaining to the private key to the server. In other words, the reset request also comprises the username of the user. The server then generates a random challenge say z, $$z \overset{R}{\leftarrow} \mathbb{Z}_p$$

such that $0<z<r_p$, and then encrypts z to obtain $Enc_v(z)$. This randomly generated and encrypted challenge $Enc_v(z)$ is obtained at the client device wherein the $Enc_v(z)$ is decrypted by the client device by using the selected private key pertaining to the user to obtain a decrypted challenge and a response is generated accordingly. In other words, the client device/user decrypts the challenge to obtain z and an appropriate response is generated/computed at the client device which is denoted by $e(g^z, u^x)$. This response is then transmitted to the server, wherein the server computes a reference result $e(g^z, v^y)$ which is compared with the client device response $e(g^z, u^x)$ for verification resp==result. This verification is performed by way of following expression:

$$e(g^z, u^x) \stackrel{?}{=} e(g^z, v^y).$$

Based on the successful verification, the client device invokes the key-pair technique for selection of a new private key and computes a new public key based on the new private key. The step of invoking is based on a reference result computed by the server and compared with the generated response as mentioned above. A result is then generated at the client device based on the new private key and the new public key. For instance, say the new private key is $$x' \xleftarrow{R} \mathbb{Z}_p$$

such that $0<x'<r_p$. The client device/user computes the new public key v' as $v'=g^{x'}$ based on which a result is generated and expressed as $result_c=e(g^z, u^{x'})$. This generated result by the client device is then transmitted along with the username, and the new public key to the server. In other words, $result_c$, username, and v' are transmitted to the server. The server then computes a reference result $result_s=e(g^z, (v')^y)$ for verifying $result_c=result_s$. Upon successful verification, the server (ii) updates the public key v with the new public key v', and (iii) outputs the encrypted shared secret u' based on uniqueness of a pair comprising the new public key v' and the shared secret u'. In other words, upon successful verification, the server updates the old public key v with new public key v' and checks the uniqueness of (u, v'). If (u, v') pair already exists, the server generates new random shared secret u' and updates u to u' in authentication database if (u', v') is unique. Thus, the client device obtains an acknowledgement along with an encrypted shared secret (e.g., ACK, $Enc_{v'}(u')$) from the server.

Figure 9:
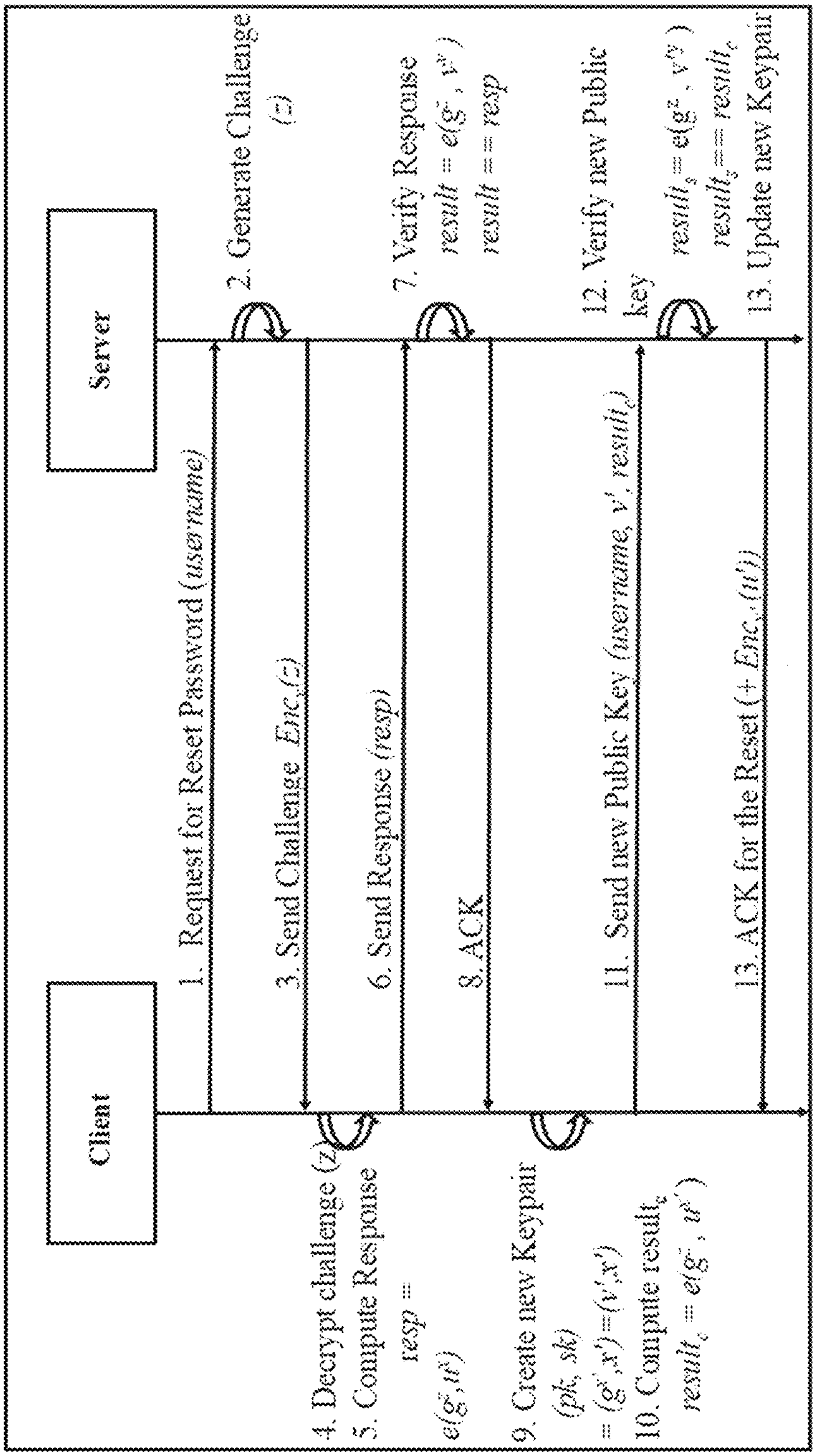
FIG. 9 depicts a sequence diagram illustrating a method of transmitting the encrypted shared secret associated with the user by the server to the client device, in the event that the private key is reset by the user, in accordance with an embodiment of the present disclosure.

FIG. 9, with reference to FIGS. 1 through 8, depicts a sequence diagram illustrating a method of transmitting the encrypted shared secret associated with the user by the server to the client device, in the event that the private key is reset by the user, in accordance with an embodiment of the present disclosure. The above steps of transmitting the shared secret associated with the user by the server and the sequence diagram of FIG. 9 may be further better understood by way of following exemplary description:

---

1. Request for Reset Password "Alice".
2. Generate Challenge
   z: 4625169984241933229311842118089055156890900 27561
   Enc(z) = (c1_z, c2_z)
   c1_z =
   [46018221467678611289358795715697486896116589366957739870
   72645000356288342029452274670596180774875206023670659384
   753942854163596156984701891430344423591530,
   80067616988367350766561733897512275548437120790513858953
   42045560382400448510851695896351496911860177034537577965
   4557021194404521589866472535482116430550 20]
   c2_z =
   [68109535499877378964319475875292444145080200179072000761
   95632171563229414718082224425622130672497106207142083449
   357942161906813616348123684399083937844202,
   78896903321079562034377695123874565802096819430787667996
   63523215470424863878560184329234346899940755355615735211
   642339971548091495578448151822670111932123]
3. Send Challenge (c1_z, c2_z)
4. Decrypt Challenge
   z: 4625169984241933229311842118089055156890900 27561
5. Compute Response
   a. g:
      [22265119087225159822043778075188972035699065911735
      94745788176768972501104490787011952471382165857 3994
      99051832179529289394513603151182800208423889297847 5
      26,
      16032606957783783802053865334606569700485989193082 9
      00496460136100606998365173645542513312193216972780 0
      70899494629138159982272982101037054483196302501915 6
      8]
   b. u:
      [84807809021842726409792441465647574859452808608355
      08185137398391965177982900710902182597721407154295 5
      14347353653578523124664002511733635797005927975324 5
      19,
      10940291746491702442346927925402144091637717437795 7
      42707968702029686136653904697746131169169497859081 9
      72877988510828810904952340532246803569257171988468 1
      2]
   c. x: 502022332400884281354750512950405119474169574486
      resp:
      [77514453968450427722142921767573159436593066832678615634
      43780853569630782581221743770856314096005063933739638354
      148537622686385661132485580242082495042224,
      46670969993601738215895920410204034746591001912425587069
      55011798637514692399919302855885207746975295120294638660
      113792278027086213681309985466935700541099]

-continued

6. Send Response: (resp)
7. Verify Response
a. v:
[92787932017868512253416082950300069684132492908514
81653040444180786359974237601555151740678519750371 71
25618046564045598465798480787058891212704139273488 6
5,
21342148119576626843521930255208905153245844903922 8
02942083494838642722860234344299044446254967610822 3
45643477074681326993849549708020875612912491586006 2
9]
b. y: 4322890007539521884325650159043100431171535513 62
result:
[77514453968450427722142921767573159436593066832678615634
43780853569630782581221743770856314096005063933739638354
14853762268638566113248558024208249504222 4,
46670969993601738215895920410204034746591001912425587069
55011798637514692399919302855885207746975295120294638660
11379227802708621368130998546693570054109 9]
8. ACK
9. Create new Keypair:
a. x': 67781265402473407434679433617898535616962058157 5
b. $v' = g^{x'}$
[25762164204957602773637370807342411852785421798387
18183497560910578521670110864093746942903507933000 3
72959913946215093705288114282283192344748507980349 7
68,
15125902365522303895495075512027561242066455065705 3
51659800460484601258013352441667942258725687247049 1
51432228582390671987538074555957488410253649022971 8
1]
10. Compute $result_c$:
$result_c$ =
[31938459462592426858919556080519744539178488802579684619
36153340996310558714047710385297375541893257867231308727
85856554401776771165727837607397358031292 0,
30703869204180187736588077844008630160936668350033065610
58786925660040841594647631304844698500217374839025500541
66861150314547244701687631782947136532324 8]
11. Send new Public Key:
a. Username = Alice
b. v':
[25762164204957602773637370807342411852785421798387
18183497560910578521670110864093746942903507933000 3
72959913946215093705288114282283192344748507980349 7
68,
15125902365522303895495075512027561242066455065705 3
51659800460484601258013352441667942258725687247049 1
51432228582390671987538074555957488410253649022971 8
1]
c. $result_c$:
[31938459462592426858919556080519744539178488802579
68461936153340996310558714047710385297375541893257 8
67231308727858565544017767711657278376073973580312 9
20,
30703869204180187736588077844008630160936668350033 0
65610587869256600408415946476313048446985002173748 3
90255005416686115031454724470168763178294713653232 4
8]
12. Verify new Public key
$result_s$ =
[31938459462592426858919556080519744539178488802579684619
36153340996310558714047710385297375541893257867231308727
85856554401776771165727837607397358031292 0,
30703869204180187736588077844008630160936668350033065610
58786925660040841594647631304844698500217374839025500541
66861150314547244701687631782947136532324 8]
Verified as $result_c == result_s$
13. Update new Keypair:
Server updates the old public key v with new public key v' and checks the uniqueness of (u, v'). If (u, v') pair already exists, server generates new random shared secret u' and updates u to u' in server's database only if (u', v') is unique.
14. ACK for the Reset
Enc(u') = (c1_u', c2_u')
c1_u' =
[46018221467678611289358795715697486896116589366957739870
72645000356288342029452274670596180774875206023670659384
75394285416359615698470189143034442359153 0, -continued

```
80067616988367350766561733897512275548437120790513858953
42045560382400448510851695896351496911860177034537577965
455702119440452158986647253548211643055020]
c2__u'=
[19237525399259228072555081806541419450185431650592485298
03847494319499008379364008610938399580410347623439864415
098840283232699495447834644965047406668940,
54537836325514223474000440201461252106456757702938722660
46797818044863362746117272573218365134891654262274508910
207785925806014051730119766835760030841806].
```

Bilinear pairings have been used in literature for authentication, however existing systems store hash of password on server side, which can potentially lead to brute force attack on password hash and retrieval of password. However, in the system of the present disclosure, the method completely avoids transmission of password or other information from which password can be derived to the server thus achieving a non-trivial application of the bilinear pairings. Further, the system and method effectively work even in untrusted environments. For instance, despite most messages exchanged between client and server being unencrypted, the scheme remains secure (because of the hardness of DLP). It is to be noted that client and server authentication happen completely using unencrypted messages. This system and method of the present disclosure is efficient since the present disclosure and its systems use low computational resources. Furthermore, flexible password-based authentication systems not requiring transmission of passwords such as those based on state-of-the art zero knowledge proofs are computationally intensive. In comparison, the method of the present disclosure is computationally efficient and can be easily implemented using state-of-the art pairing based cryptographic libraries with minimal effort. The system and method of the present disclosure provide balanced security, privacy, usability, and the like. For instance, password-less authentication systems such as FIDO2/WebAuthn suffer from device dependence and difficulty of account retrieval. However, the method of the present disclosure provides a lot of user flexibility by providing efficient fallback mechanisms. Moreover, the present disclosure enables mutual authentication of the server and the client/user without revealing password. For instance, existing client server mutual authentication protocols are certificate-based. These protocols rely on third-party certificate authorities (CAs) for certificate issuance. Moreover, there is a risk posed by certificate revocations to reflect throughout the system. The present disclosure enables client/user and server to authenticate to one another without ever having to communicate their respective secrets. It is to be understood by a person having ordinary skill in the art or person skilled in the art that techniques implemented by the system 100 and the method described herein such as Elliptic curve based bilinear pairings, and ElGamal encryption scheme for encryption and pair generation shall not be construed as limiting the scope of the present disclosure. The present disclosure and the system and method described herein provide the following advantages:

1. Password is not transmitted to the server during authentication phase, hence no scope of password theft/security vulnerabilities/replay attacks during transit.
2. Username and public key (a function of password, but not the actual password) are only transmitted once during registration or setup phase
3. User does not need to remember the password. to the server.
4. The system's architecture does not rely on a physical device binding for authentication. Hence, more user friendly even in case of loss/device theft. This does not necessitate specialized hardware or software, making it a cost-effective choice for businesses.

The system 100 and the method of the present disclosure may be implemented in any domain, for example, in Internet of Things (IoT) device mutual authentication with the server without revealing sensitive information such as keys of unique identifiers. Other practical applications include, but are not limited to, implementing for application programming interface (API) authentication where API service must confirm its authentication with the client application and the client (e.g., user) has to authenticate itself to an API, or mutual authentication in 5G or new generation technologies, and the like. It is to be understood by a person having ordinary skill in the art or person skilled in the art that the above-mentioned practical applications shall not be construed as limiting the scope of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

invoking, at a client device, a key-pair technique via one or more hardware processors, for selection of a private key for a user;

computing, by using the key-pair technique via the one or more hardware processors, a public key based on the selected private key;

selecting, at the client device, a username for the user; and obtaining, at the client device, an encrypted shared secret generated by a server based on at least one of the username and the computed public key, wherein the shared secret is unique and specific to the user, wherein the encrypted shared secret is indicative of a successful registration of the user at the server, and wherein the shared secret is computed based on a randomly selected server secret.

2. The processor implemented method of claim 1, further comprising:

transmitting via the client device an authentication request to the server;

obtaining at the client device a challenge from the server;

transmitting a response by the client device to the server based on the obtained challenge; and obtaining, from the server, an authentication confirmation of the user based on a comparison of the transmitted response with a reference response generated by the server.

3. The processor implemented method of claim 1, wherein the server is authenticated by:

obtaining by the server a challenge and the username unique to the user from the client device;

retrieving by the server an associated public key pertaining to the username and generating a response thereof; and authenticating the server based on a reference response generated by the client device based on the associated public key and the generated response.

4. The processor implemented method of claim 1, further comprising in an event that the shared secret is forgotten by the user:

transmitting, from the client device, the username specific to the user to the server;

obtaining, by the client device, a randomly generated and encrypted challenge from the server, wherein the randomly generated and encrypted challenge is based on the computed public key associated with the user;

decrypting, by the client device, the randomly generated and encrypted challenge obtained from the server by using the selected private key associated with the user to obtain a decrypted challenge;

computing a response to the decrypted challenge and transmitted to the server thereof; and obtaining the encrypted shared secret from the server based on a comparison of the computed response with a reference result computed by the server.

5. The processor implemented method of claim 1, further comprising in an event that the username is forgotten by the user:

transmitting, by the client device, an encrypted set of parameters comprising the shared secret and the computed public key associated with the user to the server; wherein the encrypted set of parameters is based on a computed public key associated with the server; and obtaining the username specific to the user based on a comparison of (i) a tuple comprising the shared secret and the computed public key being decrypted by the server, and (ii) an associated authentication database.

6. The processor implemented method of claim 1, further comprising:

in an event that the selected private key is forgotten by the user:

invoking at the client device, the key-pair technique, for randomly selecting a new private key for the user;

computing, by the client device, a new public key for the user based on the new selected private key;

transmitting, by the client device, an encrypted set of parameters comprising the username, the shared secret, and the new public key to the server; wherein the encrypted set of parameters is based on a computed public key associated with the server; and obtaining, from the server, an acknowledgement along with an encrypted shared secret by the client device, wherein the server (a) performs a comparison of (i) the shared secret being decrypted by the server, and (ii) an associated authentication database, (b) updates the public key with the new public key, and (c) outputs the encrypted shared secret based on uniqueness of a pair comprising the new public key and the shared secret.

7. The processor implemented method of claim 1, further comprising:

in an event that the private key is to be reset by the user:

transmitting, by the client device, a reset request pertaining to the private key to the server;

obtaining, by the client device, a randomly generated and encrypted challenge from the server in response to the reset request;

decrypting, by the client device, the randomly generated and encrypted challenge by using the selected private key pertaining to the user to obtain a decrypted challenge;

generating, at the client device, a response to the decrypted challenge;

invoking, the key-pair technique comprised in the client device, for selection of a new private key and computing a new public key based on the new private key, wherein the step of invoking is based on a reference result computed by the server and compared with the generated response;

generating, by the client device, a result based on the new private key and the new public key;

transmitting, by the client device, the generated result, the username, and the new public key to the server; and obtaining, from the server, an acknowledgement along with an encrypted shared secret by the client device, wherein the server (i) computes a reference result and verifies with the generated result, (ii) updates the public key with the new public key, and (iii) outputs the encrypted shared secret based on uniqueness of a pair comprising the new public key and the shared secret.

8. A client device, comprising:

a memory storing instructions;

one or more communication interfaces; and one or more hardware processors coupled to the memory via the one or more communication interfaces, wherein the one or more hardware processors are configured by the instructions to:

invoke a key-pair technique for selection of a private key for a user;

compute, by using the key-pair technique, a public key based on the selected private key;

select a username for the user; and obtain an encrypted shared secret generated by a server based on at least one of the username and the computed public key, wherein the shared secret is unique and specific to the user, wherein the encrypted shared secret is indicative of a successful registration of the user at the server, and wherein the shared secret is computed based on a randomly selected server secret.

9. The client device of claim 8, wherein the user is authenticated by:

transmitting via the client device an authentication request to the server;

obtaining at the client device a challenge from the server;

transmitting a response by the client device to the server based on the obtained challenge; and obtaining, from the server, an authentication confirmation of the user based on a comparison of the transmitted response with a reference response generated by the server.

10. The client device as claimed in claim 8, wherein the server is authenticated by:

obtaining by the server a challenge and the username unique to the user from the client device;

retrieving by the server an associated public key pertaining to the username and generating a response thereof; and authenticating the server based on a reference response generated by the client device based on the associated public key and the generated response.

11. The client device of claim 8, wherein in an event that the shared secret is forgotten by the user, the client device is further configured by the instructions to:

transmit the username specific to the user to the server;

obtain a randomly generated and encrypted challenge from the server, wherein the randomly generated and encrypted challenge is based on the computed public key associated with the user;

decrypt the randomly generated and encrypted challenge obtained from the server by using the selected private key associated with the user to obtain a decrypted challenge;

compute a response to the decrypted challenge and transmitted to the server thereof; and obtain the encrypted shared secret from the server based on a comparison of the computed response with a reference result computed by the server.

12. The client device of claim 8, wherein in an event that the username is forgotten by the user, the client device is further configured by the instructions to:

transmit an encrypted set of parameters comprising the shared secret and the computed public key associated with the user to the server; wherein the encrypted set of parameters is based on a computed public key associated with the server; and obtain the username specific to the user based on a comparison of (i) a tuple comprising the shared secret and the computed public key being decrypted by the server, and (ii) an associated authentication database.

13. The client device of claim 8, wherein in an event that the selected private key is forgotten by the user, the client device is further configured by the instructions to:

invoke the key-pair technique, for randomly selecting a new private key for the user;

compute a new public key for the user based on the new selected private key;

transmit an encrypted set of parameters comprising the username, the shared secret, and the new public key to the server; wherein the encrypted set of parameters is based on a computed public key associated with the server; and obtain, from the server, an acknowledgement along with an encrypted shared secret, wherein the server (a) performs a comparison of (i) the shared secret being decrypted by the server, and (ii) an associated authentication database, (b) updates the public key with the new public key, and (c) outputs the encrypted shared secret based on uniqueness of a pair comprising the new public key and the shared secret.

14. The client device of claim 8, wherein in an event that the private key is to be reset by the user, the client device is further configured by the instructions to:

transmit a reset request pertaining to the private key to the server;

obtain a randomly generated and encrypted challenge from the server in response to the reset request;

decrypt the randomly generated and encrypted challenge by using the selected private key pertaining to the user to obtain a decrypted challenge;

generate a response to the decrypted challenge;

invoke, the key-pair technique, for selection of a new private key and computing a new public key based on the new private key, wherein the step of invoking is based on a reference result computed by the server and compared with the generated response;

generate a result based on the new private key and the new public key;

transmit the generated result, the username, and the new public key to the server; and obtain, from the server, an acknowledgement along with an encrypted shared secret by the client device, wherein the server (i) computes a reference result and verifies with the generated result, (ii) updates the public key with the new public key, and (iii) outputs the encrypted shared secret based on uniqueness of a pair comprising the new public key and the shared secret.

15. One or more non-transitory machine-readable information storage mediums comprising one or more instructions which when executed by one or more hardware processors cause:

invoking, at a client device, a key-pair technique for selection of a private key for a user;

computing, by using the key-pair technique via the one or more hardware processors, a public key based on the selected private key;

selecting, at the client device, a username for the user; and obtaining, at the client device, an encrypted shared secret generated by a server based on at least one of the username and the computed public key, wherein the shared secret is unique and specific to the user, wherein the encrypted shared secret is indicative of a successful registration of the user at the server, and wherein the shared secret is computed based on a randomly selected server secret.

16. The one or more non-transitory machine-readable information storage mediums of claim 15, wherein the one or more instructions which when executed by the one or more hardware processors cause:

transmitting via the client device an authentication request to the server;

obtaining at the client device a challenge from the server;

transmitting a response by the client device to the server based on the obtained challenge; and obtaining, from the server, an authentication confirmation of the user based on a comparison of the transmitted response with a reference response generated by the server.

17. The one or more non-transitory machine-readable information storage mediums of claim 15, wherein the server is authenticated by:

obtaining by the server a challenge and the username unique to the user from the client device;

retrieving by the server an associated public key pertaining to the username and generating a response thereof; and authenticating the server based on a reference response generated by the client device based on the associated public key and the generated response.

18. The one or more non-transitory machine-readable information storage mediums of claim 15, wherein the one or more instructions which when executed by the one or more hardware processors further cause in an event that the shared secret is forgotten by the user:

transmitting, from the client device, the username specific to the user to the server;

obtaining, by the client device, a randomly generated and encrypted challenge from the server, wherein the randomly generated and encrypted challenge is based on the computed public key associated with the user;

decrypting, by the client device, the randomly generated and encrypted challenge obtained from the server by using the selected private key associated with the user to obtain a decrypted challenge;

computing a response to the decrypted challenge and transmitted to the server thereof; and obtaining the encrypted shared secret from the server based on a comparison of the computed response with a reference result computed by the server, and wherein in an event that the username is forgotten by the user:

transmitting, by the client device, an encrypted set of parameters further comprising the shared secret and the computed public key associated with the user to the server; wherein the encrypted set of parameters is based on a computed public key associated with the server; and obtaining the username specific to the user based on a comparison of (i) a tuple further comprising the shared secret and the computed public key being decrypted by the server, and (ii) an associated authentication database.

19. The one or more non-transitory machine-readable information storage mediums of claim 15, wherein the one or more instructions which when executed by the one or more hardware processors further cause:

in an event that the selected private key is forgotten by the user:

invoking at the client device, the key-pair technique, for randomly selecting a new private key for the user;

computing, by the client device, a new public key for the user based on the new selected private key;

transmitting, by the client device, an encrypted set of parameters further comprising the username, the shared secret, and the new public key to the server; wherein the encrypted set of parameters is based on a computed public key associated with the server; and obtaining, from the server, an acknowledgement along with an encrypted shared secret by the client device, wherein the server (a) performs a comparison of (i) the shared secret being decrypted by the server, and (ii) an associated authentication database, (b) updates the public key with the new public key, and (c) outputs the encrypted shared secret based on uniqueness of a pair further comprising the new public key and the shared secret.

20. The one or more non-transitory machine-readable information storage mediums of claim 15, wherein the one or more instructions which when executed by the one or more hardware processors further cause:

in an event that the private key is to be reset by the user:

transmitting, by the client device, a reset request pertaining to the private key to the server;

obtaining, by the client device, a randomly generated and encrypted challenge from the server in response to the reset request;

decrypting, by the client device, the randomly generated and encrypted challenge by using the selected private key pertaining to the user to obtain a decrypted challenge;

generating, at the client device, a response to the decrypted challenge;

invoking, the key-pair technique comprised in the client device, for selection of a new private key and computing a new public key based on the new private key, wherein the step of invoking is based on a reference result computed by the server and compared with the generated response;

generating, by the client device, a result based on the new private key and the new public key;

transmitting, by the client device, the generated result, the username, and the new public key to the server; and obtaining, from the server, an acknowledgement along with an encrypted shared secret by the client device, wherein the server (i) computes a reference result and verifies with the generated result, (ii) updates the public key with the new public key, and (iii) outputs the encrypted shared secret based on uniqueness of a pair further comprising the new public key and the shared secret.

* * * * *